(12) United States Patent
Chen et al.

(10) Patent No.: US 8,714,198 B1
(45) Date of Patent: May 6, 2014

(54) CONTROL VALVE MECHANISM FOR FAUCETS

(71) Applicants: Jui-Chien Chen, Lugang Township, Changhua County (TW); Jui-Ching Chen, Lugang Township, Changhua County (TW)

(72) Inventors: Jui-Chien Chen, Lugang Township, Changhua County (TW); Jui-Ching Chen, Lugang Township, Changhua County (TW)

( * ) Notice: Subject to any disclaimer, the term of this patent is extended or adjusted under 35 U.S.C. 154(b) by 0 days.

(21) Appl. No.: 13/748,081

(22) Filed: Jan. 23, 2013

(51) Int. Cl.
*F16K 11/22* (2006.01)

(52) U.S. Cl.
USPC ........ 137/606; 137/454.2; 251/246; 251/323; 251/339

(58) Field of Classification Search
USPC ................ 137/454.2, 606; 251/242–246, 251/319–323, 339
See application file for complete search history.

(56) References Cited

U.S. PATENT DOCUMENTS

| | | | | |
|---|---|---|---|---|
| 2,270,932 A | * | 1/1942 | Cornelius | 251/231 |
| 4,815,703 A | * | 3/1989 | Antoniello | 251/251 |
| 5,123,445 A | * | 6/1992 | Chung-Shan | 137/606 |
| 5,294,093 A | * | 3/1994 | Huveteau et al. | 251/263 |
| 6,575,187 B2 | * | 6/2003 | Leys et al. | 137/15.21 |
| 6,857,446 B1 | * | 2/2005 | Hoeptner, III | 137/218 |
| 7,093,615 B2 | * | 8/2006 | Shane | 137/801 |
| 7,124,776 B1 | * | 10/2006 | Hwang | 137/606 |
| 8,534,326 B2 | * | 9/2013 | Jochumsen et al. | 137/896 |
| 2009/0255596 A1 | * | 10/2009 | Leys | 137/606 |

* cited by examiner

*Primary Examiner* — John K Fristoe, Jr.
*Assistant Examiner* — Reinaldo Sanchez-Medina
(74) *Attorney, Agent, or Firm* — Egbert Law Offices, PLLC

(57) ABSTRACT

An improved faucet control valve has a valve seat, a spring, a one-piece valve stem, an expanded end, a flexible hooking portion and a control unit. The one-piece valve stem manufactured integrally enables to realize convenient manufacturing, cost reduction and structural simplification of control members. The one-piece valve stem is only required to penetrate the valve port of the valve seat from top to bottom, enabling engagement of the flexible hooking portion for simple and fast assembly.

4 Claims, 7 Drawing Sheets

CONTROL VALVE MECHANISM FOR FAUCETS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a control valve mechanism, and more particularly to an innovative one designed for faucets.

2. Description of Related Art

Including Information Disclosed Under 37 CFR 1.97 and 37 CFR 1.98.

Conventional faucets are generally provided with control valves for switching water discharge or cut-off. Currently, there are a variety of faucets on the market along with many optional types of control valves. The present invention is developed specifically for a control valve mechanism wherein its valve body is pressed downwards via a control member.

As for a conventional control valve mechanism, a spring is generally set on the valve seat, and then the valve body is abutted against the spring via a control member, so that the spring is pressed to move downwards for the switching of the faucet. However, if the valve body of such structure needs to be maintained, said spring may pop out easily at the moment the valve body is removed, thus causing safety concerns, possible loss of the spring and abrupt rise of maintenance cost.

In view of above-mentioned problems, a control valve structure with a built-in spring has been developed. Referring to FIG. 1, the control valve A (referred to as a cold or hot water valve) of the prior art allows a groove 02 to be set on top surface of its valve seat 01, and a valve hole 03 is set on the bottom of the groove 02. The spring 04 is placed into the groove 02, of which a pressing member 05 with screw hole 06 is set above the spring 04, and then a valve stem 07 with threaded portion 08 is penetrated upwards into the valve hole 03 and set into the screw hole 06 of pressing member 05. Moreover, the lower end of the valve stem 07 is expanded to form a head 09. When maintenance is needed, the entire control valve A could be disassembled for an improved safety. However, the following shortcomings are still observed during applications. As the pressing member 05 and valve stem 07 are manufactured separately and then assembled, this requires for separate molding, but it significantly increases the manufacturing cost, and the complicated structure may also result in slow and time-consuming disassembly, maintenance or assembly process.

Thus, to overcome the aforementioned problems of the prior art, it would be an advancement if the art to provide an improved structure that can significantly improve the efficacy.

Therefore, the inventor has provided the present invention of practicability after deliberate design and evaluation based on years of experience in the production, development and design of related products.

BRIEF SUMMARY OF THE INVENTION

The enhanced efficacy of the present invention is as follows:

Based on the innovative structural design of the "improved mechanism of faucet control valve" of the present invention wherein said control valve comprises a valve seat, spring, one-piece valve stem, expanded end, flexible hooking portion and control unit, the one-piece valve stem manufactured integrally enables to realize convenient manufacturing (e.g.: by ejection molding of plastics without setting of screw hole), cost reduction (a single mold is required to reduce manufacturing cost) and structural simplification of control members (the prior art is of a two-piece pattern, and the one-piece valve stem 30 of present invention is integrally manufactured, so the members are simplified, and the structural strength of one-piece valve stem could be enhanced). Besides, the one-piece valve stem is only required to penetrate the valve port of the valve seat from top to bottom, enabling engagement of the flexible hooking portion for simple and fast assembly.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
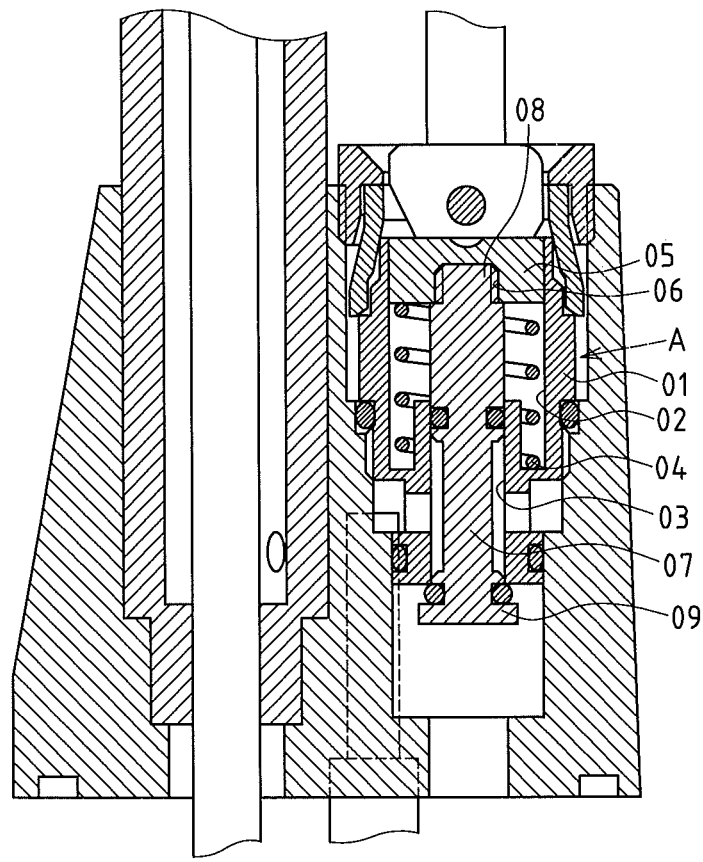
FIG. 1 is an assembled sectional view of a conventional control valve.

FIGS. 2-6 depict preferred embodiments of the improved mechanism of faucet control valve of the present invention, which, however, are provided for only explanatory objective. Said faucet 10 comprises: a seat body 11, an outlet 12 and at least a vertical inlet opening 13. Of which, said outlet 12 is depressed onto said seat body 11 and provided with a discharge pipe 121. Said vertical inlet opening 13 vertically passes through the seat body 11 and discharge pipe 121, and also comprises of a bottom inlet 14. A connection pipe 15 is set between the vertical inlet opening 13 and discharge pipe 121. Said control valve 20 is set into the vertical inlet opening 13 to switch the opening or closing state of the bottom inlet 14 and discharge pipe 121.

The control valve 20 comprises the following.

Figure 6:
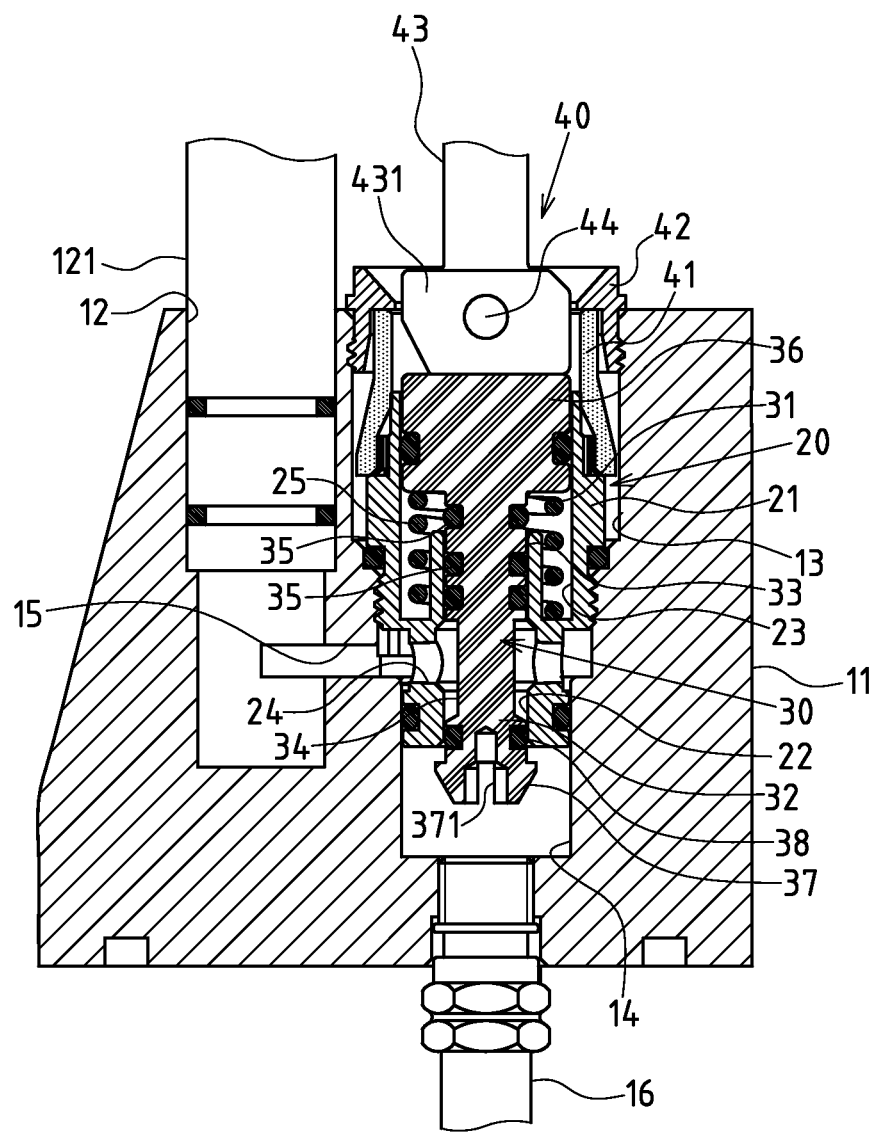
FIG. 6 is an assembled sectional view of a preferred embodiment of the present invention.

A valve seat 21 is assembled into the vertical inlet opening 13, and comprises of a valve port 22 passing vertically through the center of the valve seat 21 and an assembly groove 23 depressed into top surface of the valve seat 21 and connected with the valve port 22. Of which, at least a through-hole 24 is set on the peripheral wall of the valve seat 21 and connected with the connection pipe 15 and valve port 22. Referring to FIG. 6, the valve seat 21 can be bolted securely into the vertical inlet opening 13. Of which, the valve seat 21 is made of metal or plastic materials.

A spring 25 is placed into assembly groove 23 of the valve seat 21.

A one-piece valve stem 30 is integrally fabricated and limited to the valve port 22 of valve seat 21 by penetrating the assembly groove 23 downwards. It comprises of: a top end 31, a bottom end 32 and a peripheral wall 33. Of which, a water guide slot 34 is set adjacent to the bottom end 32 of one-piece valve stem 30 correspondingly to the through-hole 24 of the valve seat 21. At least a seal ring 35 is set on the peripheral wall 33 of the one-piece valve stem 30 at a spacing with the water guide slot 34. Of which, the one-piece valve stem 30 is made of plastic materials.

An expanded end 36 is integrally fabricated and formed at the top end 31 of one-piece valve stem 30, and also abutted against the top end of the spring 25.

A flexible hooking portion 37 is integrally formed at the bottom end 32 of one-piece valve stem 30. A groove 371 is set at the bottom center of said flexible hooking portion 37, such that the one-piece valve stem 30 can be inserted into the valve port 22 of the valve seat 21. When the one-piece valve stem 30 penetrates downwards the valve port 22, the flexible hooking portion 37 could be flexibly reset outwards, enabling engagement of the one-piece valve stem 30. Of which, a second seal ring 38 is set on the peripheral wall 33 of the one-piece valve stem 3 between the flexible hooking portion 37 and water guide slot 34.

Figure 4:
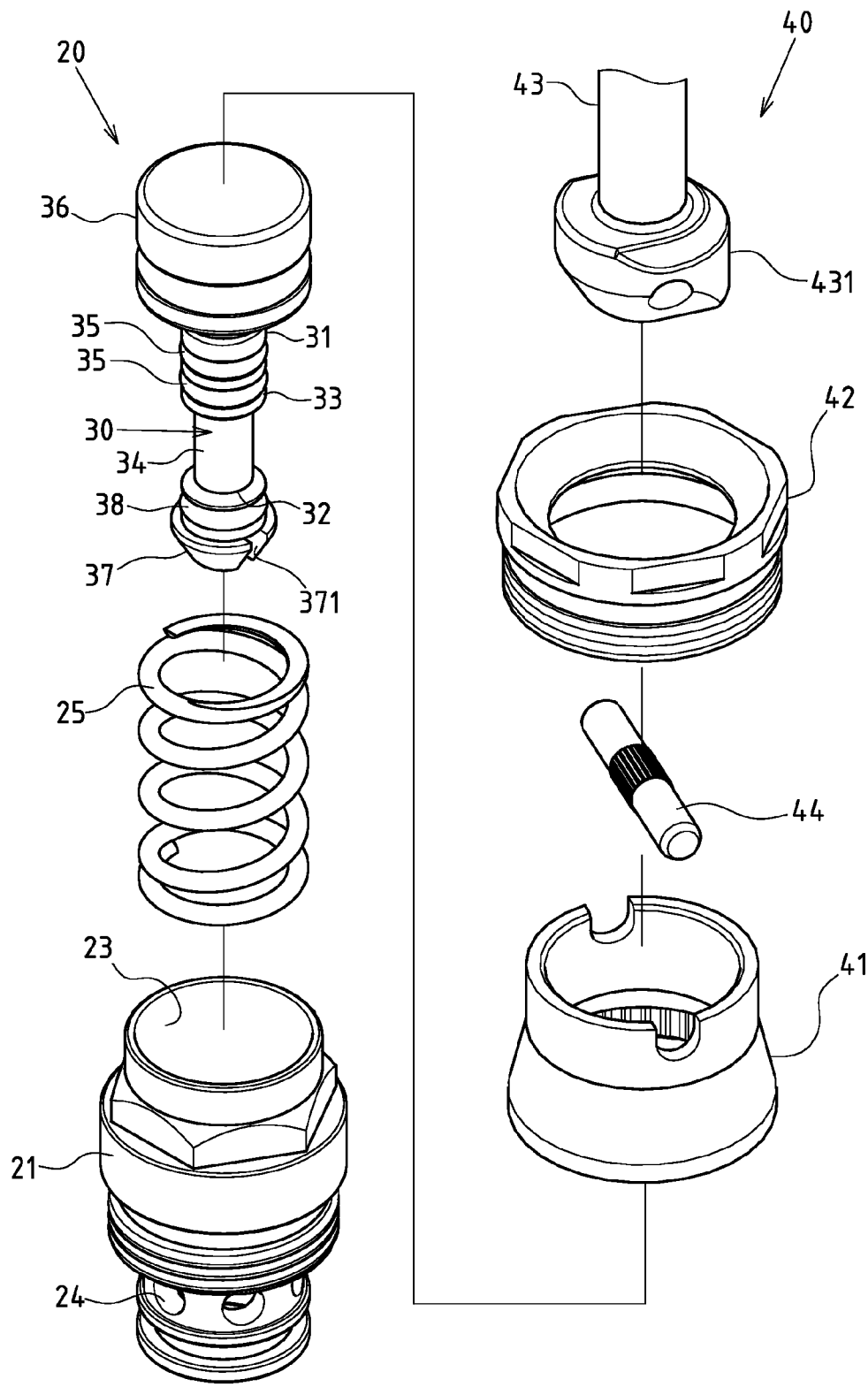
FIG. 4 is an exploded perspective view of the control valve of the present invention.
Figure 5:
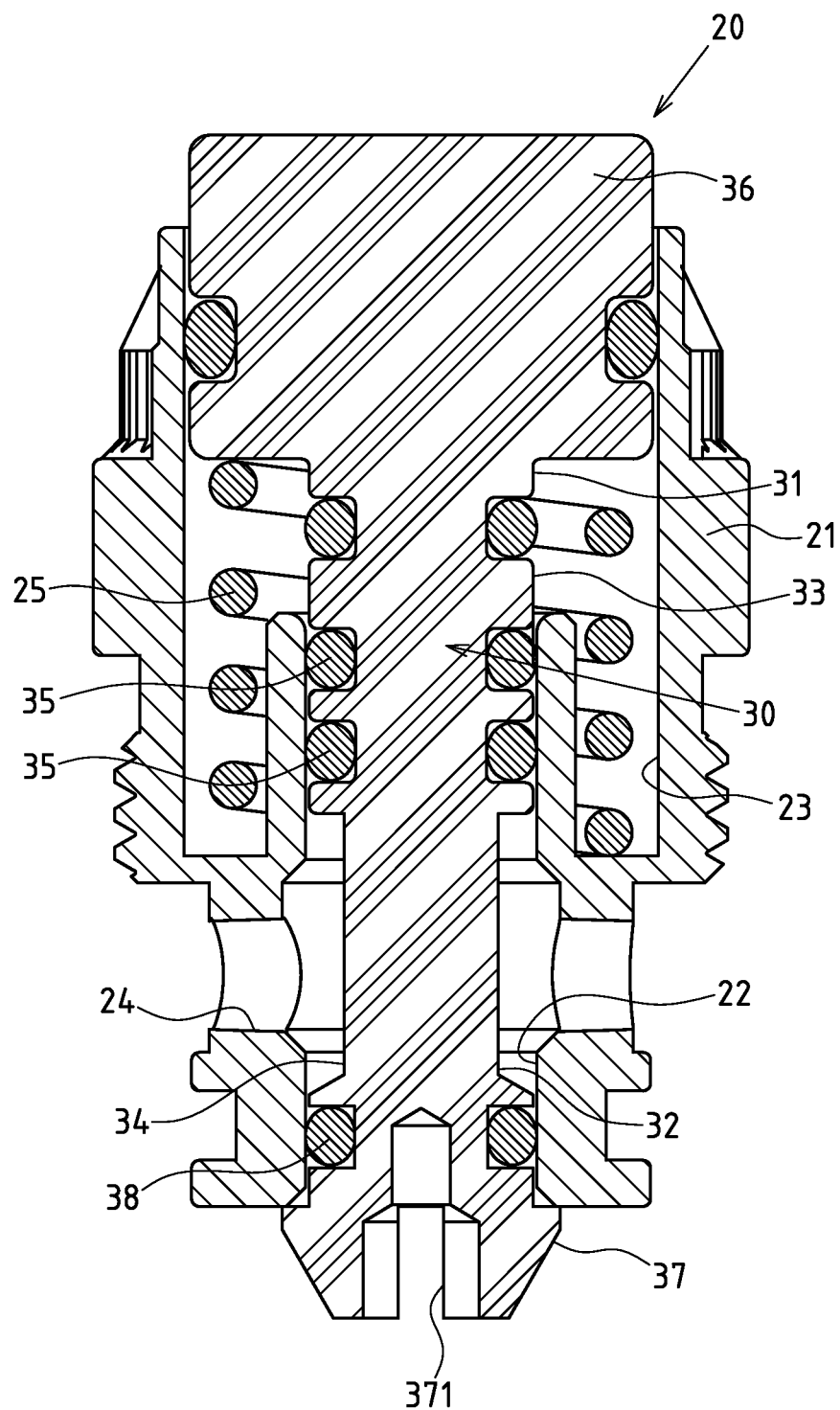
FIG. 5 is an assembled sectional view of the control valve of the present invention.

A control unit 40 is located above the one-piece valve stem 30, used to operate and press the expanded end 36, driving the one-piece valve stem 30 to move downwards and forcing the disengagement of the flexible hooking portion 37 and the second seal ring 38 from the valve port 22 of the valve seat 21. In such a case, the bottom inlet 14 could be connected with the water guide slot 34, through-hole 24, connection pipe 15 and discharge pipe 121 (referring to FIG. 7). Referring also to FIGS. 4 and 6, the control unit 40 comprises of an abutting ring 41, a locating ring 42 and an actuating rod 43. Of which, the abutting ring 41 is set above the valve seat 21, the locating ring 42 is screwed in the vertical inlet opening 13 against the abutting ring 41, and said actuating rod 43 is secured onto the abutting ring 41 via a pivotal shaft 44 in a rotary state. Furthermore, a pressing portion 431 is set at the bottom end of the actuating rod 43. Thus, with the rotation of the actuating rod 43, it is possible to switch the pressing portion 431 for pressing downwards or releasing the expanded end 36.

Figure 2:
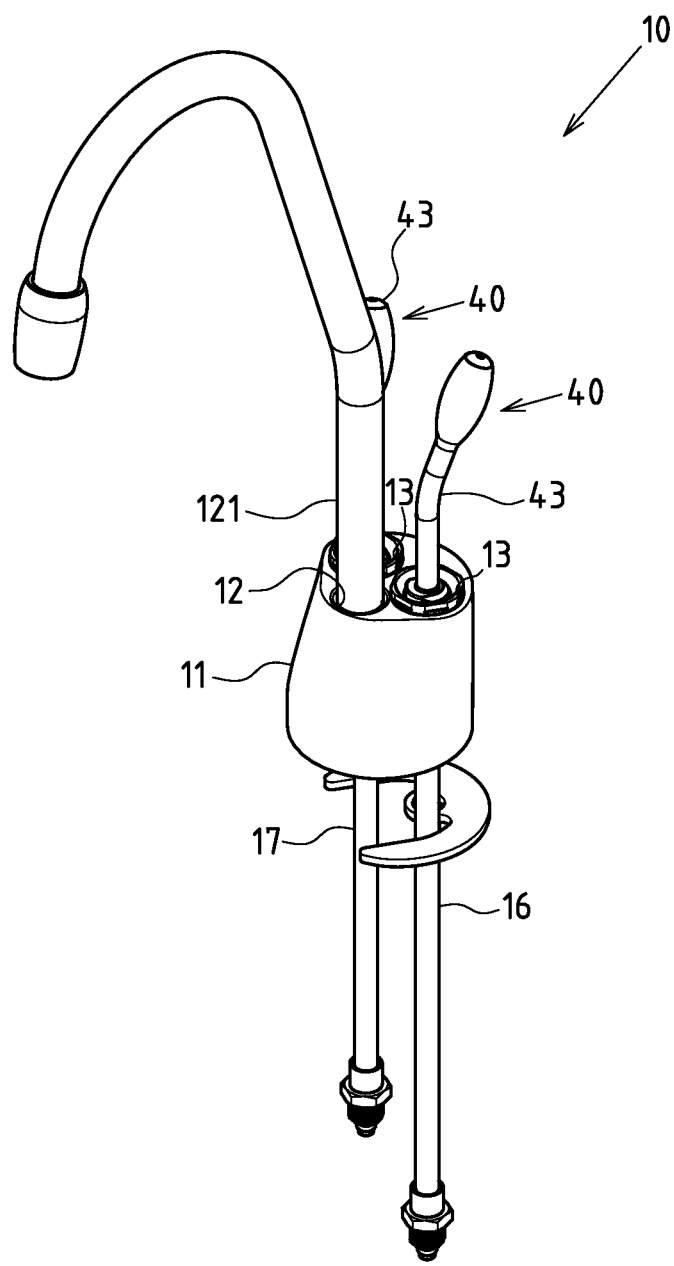
FIG. 2 is an assembled perspective view of a preferred embodiment of the present invention.
Figure 3:
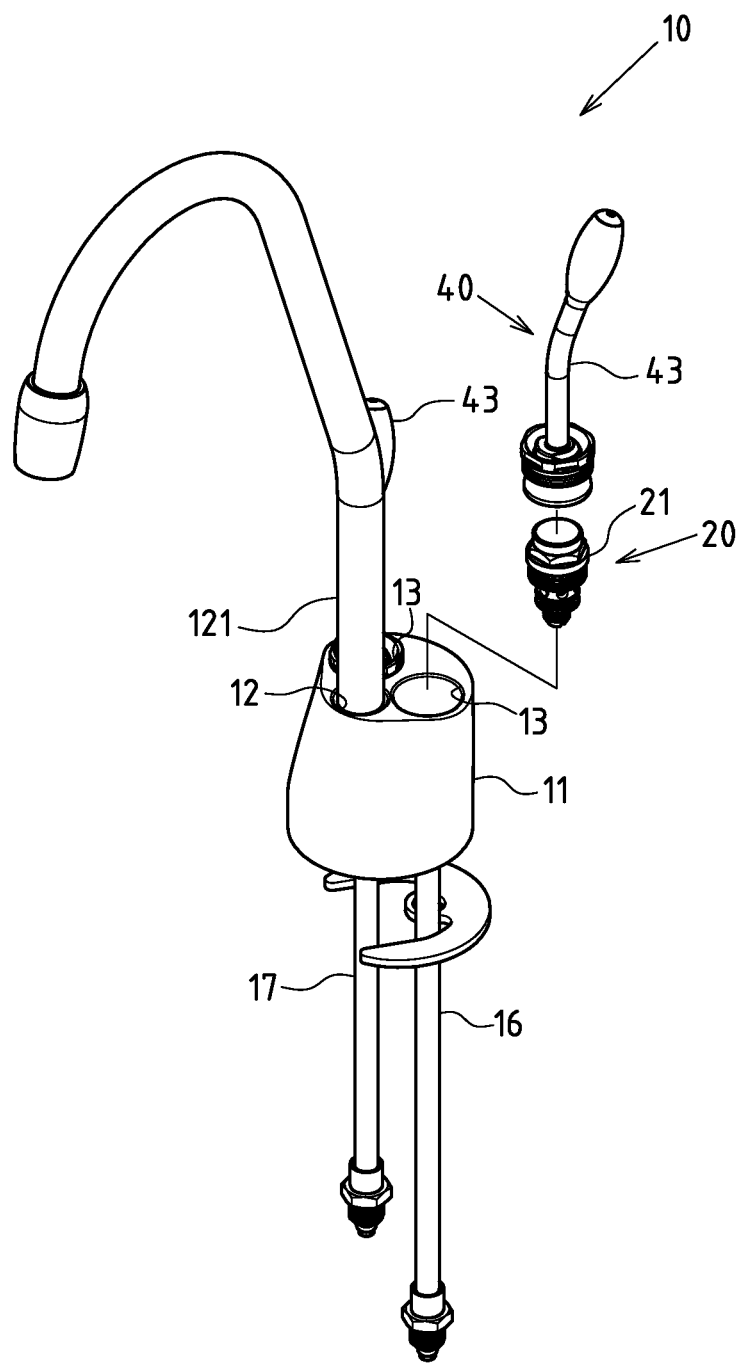
FIG. 3 is an exploded perspective view of the control valve and seat body of the present invention.

Referring to FIGS. 2 and 3, the faucet 10 comprises of two vertical inlet openings 13. A cold water inlet pipe 16 and a hot water inlet pipe 17 are set separately at the bottom inlets 14 of two vertical inlet openings 13, ensuring that the faucet 10 can supply cold and hot water.

The seal ring 35 and second seal ring 38 are made of either of rubber, silicone or soft plastic materials.

Based on the above-specified structural design, the present invention is operated as follows:

Referring to FIG. 4, the present invention is characterized by one-piece valve stem 30 manufactured integrally. In order to realize convenient manufacturing (e.g.: by ejection molding of plastics without setting of screw hole), cost reduction (a single mold is required to reduce manufacturing cost) and structural simplification of control valve 20 (the conventional pressing member 05 and valve stem 07 are of a two-piece pattern, and the one-piece valve stem 30 of present invention is integrally manufactured, so the members are simplified, and the structural strength of one-piece valve stem 30 could be enhanced), the one-piece valve stem 30 is only required to penetrate the valve port 22 of the valve seat 21 from top to bottom, enabling engagement of the flexible hooking portion 37 for simple and fast assembly (referring to FIG. 5, the flexible hooking portion 37 is hooked at the bottom of valve seat 21 to prevent the expanded end 36 of one-piece 30 from disengaging from the valve seat 21 under flexible bracing of the spring 25).

Figure 7:
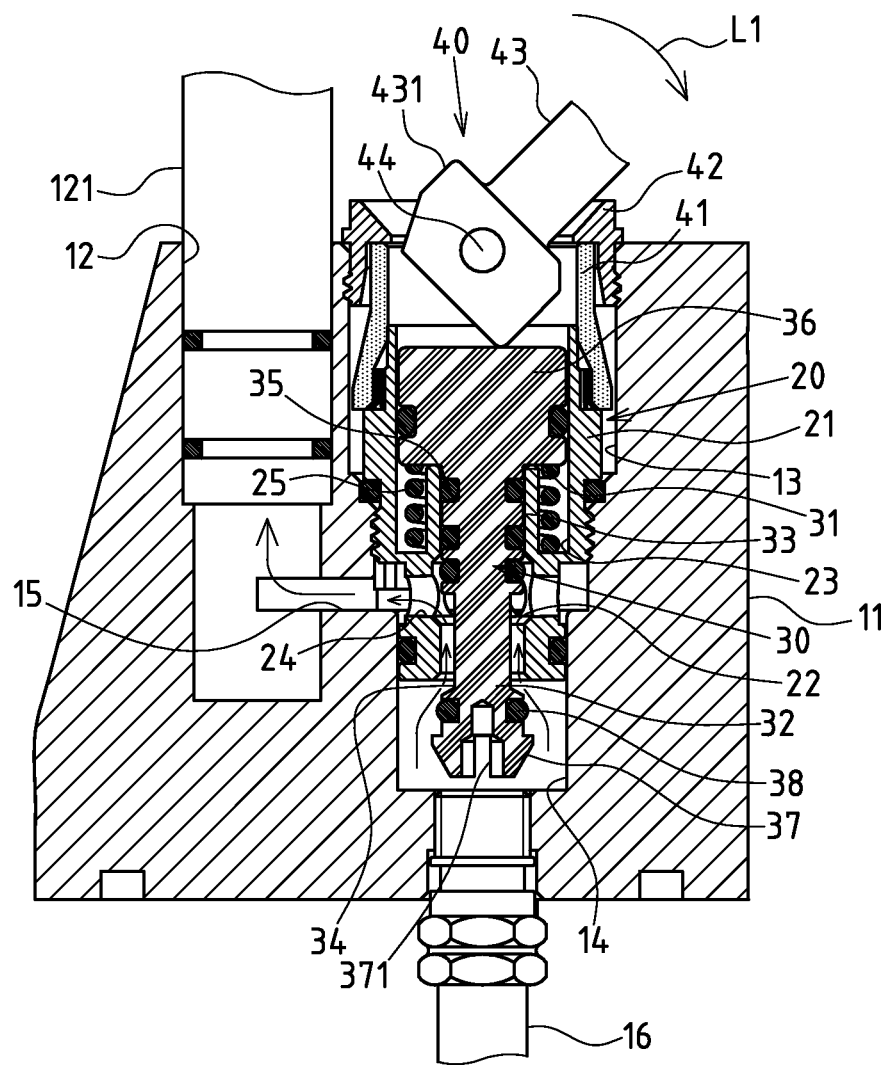
FIG. 7 is an actuation view of a preferred embodiment of the present invention.

Referring to FIG. 7, if the user intends to take water, the actuating rod 43 could be manually controlled to rotate (indicated by arrow L1), allowing its pressing portion 431 to press downwards the expanded end 36 and drive the one-piece valve stem 30 downwards. So, the flexible hooking portion 37 and the second seal ring 38 are disengaged from the valve port 22 of the valve seat 21, so that the bottom inlet 14 is connected with the water guide slot 34, through-hole 24, connection pipe 15 and discharge pipe 121 for water discharge. After rotary resetting of the actuating rod 43, said flexible hooking portion 37 and the second seal ring 38 could be reset to close the valve port 22 (referring to FIG. 6).

We claim:

1. An apparatus comprising:
   a faucet having a seat body and an outlet and at least one vertical inlet opening, said outlet being depressed onto said seat body and having a discharge pipe, the vertical inlet opening extending vertically through said seat body and said discharge pipe, said faucet having a bottom inlet and a connection pipe positioned between the vertical inlet opening and said discharge pipe; and
   a control valve positioned in the vertical inlet opening so as to open or close said bottom inlet and said discharge pipe, said control valve comprising:
      a valve seat assembled into the vertical inlet opening, said valve seat having a valve port passing vertically through a center of said valve seat and an assembly groove into a top surface of said valve seat, said assembly groove connected to said valve port, said valve seat having a through-hole formed on a peripheral wall thereof, said through-hole connected to said connection pipe and to said valve port;
      a spring positioned into said assembly groove of said valve seat;
      a one-piece valve stem limited to said valve port by penetrating said assembly groove downwardly, said valve stem having a top end and a bottom end and a peripheral wall, said valve stem having a water guide slot positioned adjacent to said bottom end of said valve stem and corresponding to said through-hole of said valve seat, said peripheral wall of said valve stem having a first seal ring in spaced relation to said water guide slot;
      an expanded end integrally formed with and at said top end of said valve stem, said expanded end abutting a top end of said spring;

a flexible hooking portion integrally formed at said bottom end of said valve stem, said hooking portion having a groove formed at a bottom center thereof, said valve stem insertable into said valve port of said valve seat such that the flexible hooking portion is flexibly set outwardly when said valve stem penetrates downwardly toward said valve port so as to enable engagement of the valve stem, said valve stem having a second seal ring positioned on said peripheral wall thereof between said flexible hooking portion and said water guide slot; and a control unit positioned above said valve stem, said control unit suitable for operating and pressing against said expanded end so as to drive said valve stem downwardly and to force a disengagement of said flexible hooking portion and the second seal ring from said valve port of said valve seat such that said bottom inlet is connected to said water guide slot and said through hole and said connection pipe and said discharge pipe for water discharge.

2. The apparatus of claim 1, said control unit having an abutting ring and a locating ring and an actuating rod, said abutting ring positioned above said valve seat, said locating ring being screwed into the vertical inlet opening and against said abutting ring, said actuating rod secured onto said abutting ring via a pivotal shaft, said actuating rod having a pressing portion at a bottom end thereof, said actuating rod being rotatable so as to switch said pressing portion for pressing downwardly or for releasing said expanded end.

3. The apparatus of claim 1, said at least one vertical inlet opening comprising a pair of vertical inlet openings, said faucet having a cold water inlet pipe connected to a bottom of one of said pair of vertical inlet openings, said faucet having a hot water inlet pipe connected to a bottom of the other of said pair of vertical inlet openings.

4. The apparatus of claim 1, each of said first and second seal rings formed of a material selected from the group consisting of rubber, silicone and polymeric material.

\* \* \* \* \*